(12) United States Patent
Numnual et al.

(10) Patent No.: US 8,368,989 B2
(45) Date of Patent: Feb. 5, 2013

(54) LIGHT AMOUNT ADJUSTING DEVICE AND OPTICAL DEVICE

(75) Inventors: Phichet Numnual, Pathumthani (TH); Takashi Nakano, Chiba (JP); Prapas Charoensilputthakun, Pathumthani (TH)

(73) Assignee: Seiko Precision Inc., Narashino-Shi (JP)

( * ) Notice: Subject to any disclaimer, the term of this patent is extended or adjusted under 35 U.S.C. 154(b) by 210 days.

(21) Appl. No.: 12/715,730

(22) Filed: Mar. 2, 2010

(65) Prior Publication Data
US 2010/0157405 A1 Jun. 24, 2010

Related U.S. Application Data

(63) Continuation of application No. PCT/JP2009/054203, filed on Mar. 5, 2009.

(30) Foreign Application Priority Data

Jun. 30, 2008 (JP) .................. 2008-170556

(51) Int. Cl.
*G02B 26/02* (2006.01)
(52) U.S. Cl. ......... 359/230; 359/234; 396/490; 396/493
(58) Field of Classification Search .................. 359/230, 359/227, 233–236; 396/483–493, 510
See application file for complete search history.

(56) References Cited

U.S. PATENT DOCUMENTS

| 6,612,755 | B1 | 9/2003 | Kamata |
| 6,869,233 | B2 * | 3/2005 | Westerweck et al. ......... 396/460 |
| 2005/0073604 | A1 | 4/2005 | Umezu |
| 2006/0152093 | A1 | 7/2006 | Oishi |

FOREIGN PATENT DOCUMENTS

| JP | 2003-161979 A1 | 6/2003 |
| JP | 2004-138953 A1 | 5/2004 |
| JP | 2004-205557 A1 | 7/2004 |
| JP | 2005-91496 A1 | 4/2005 |
| JP | 2008-65252 A1 | 3/2008 |
| KR | 10-2006-0054448 | 5/2006 |

OTHER PUBLICATIONS

Japanese Office Action issued for counterpart Japanese Patent Application No. 2008-170556 with dispatch date Nov. 15, 2011.
KIPO Notification of Submission of Opinion issued for counterpart Korean Patent Application No. 10-2010-7005260 with dispatch date Nov. 30, 2011.
Korean Office Action issued for counterpart Korean Patent Application No. 10-2010-7005260 with dispatch date Jul. 30, 2012.
International Search Report for International Application No. PCT/JP2009/054203 dated May 12, 2009.

* cited by examiner

*Primary Examiner* — James Phan
(74) *Attorney, Agent, or Firm* — Kratz, Quintos & Hanson, LLP

(57) ABSTRACT

A light amount adjusting device includes: a board including an opening; a linear moving blade linearly and movably supported by the board; and a swinging blade swingably supported by the board, wherein: the linear moving blade and the swinging blade are receded from the opening to form a fully opened state; the linear moving blade covers the opening to form a fully closed state; and the swinging blade has a small aperture opening with a diameter smaller than a diameter of the opening, and causes the small aperture opening and the opening to be overlapped with each other to form a small aperture state.

5 Claims, 4 Drawing Sheets

LIGHT AMOUNT ADJUSTING DEVICE AND OPTICAL DEVICE

CROSS-REFERENCE TO RELATED APPLICATION

This application is a continuation of and claims priority to International Patent Application No. PCT/JP2009/054203 filed on Mar. 5, 2009, which claims priority to Japanese Patent Application No. 2008-170556 filed on Jun. 30, 2008, subject matter of these patent documents is incorporated by reference herein in its entirety.

BACKGROUND OF THE INVENTION

1. Field of the Invention

The present invention relates to light amount adjusting devices and optical devices.

2. Description of the Related Art

There is conventionally known a light amount adjusting device, for use in a camera, which allows an opening formed on a board to be in a small aperture state by using plural blades. In a device disclosed in Japanese Unexamined Patent Publication No. 2008-65252, a board has a rectangular shape, and blades linearly move in the longitudinal direction of the board. The device disclosed in Japanese Unexamined Patent Publication No. 2008-65252 is a so-called guillotine type of a light amount adjusting device.

In the device disclosed in Patent Document 1, however the plural blades cooperatively reduce the aperture of the opening, so that the fluctuation in the aperture may be caused in the small aperture state due to a slight displacement of the blade or the like. This may fluctuate the amount of exposure and influence image quality.

SUMMARY OF THE INVENTION

It is therefore an object of the present invention to provide a light amount adjusting device and an optical device which suppress the fluctuation in image quality.

According to an aspect of the present invention, there is provided a light amount adjusting device including: a board including an opening; a linear moving blade linearly and movably supported by the board; and a swinging blade swingably supported by the board, wherein: the linear moving blade and the swinging blade are receded from the opening to form a fully opened state; the linear moving blade covers the opening to form a fully closed state; and the swinging blade has a small aperture opening with a diameter smaller than a diameter of the opening, and causes the small aperture opening and the opening to be overlapped with each other to form a small aperture state.

BRIEF DESCRIPTION OF THE DRAWINGS

Preferred embodiments of the present invention will be described in detail with reference to the following drawings, wherein.

DESCRIPTION OF THE PREFERRED EMBODIMENTS

Figure 1:
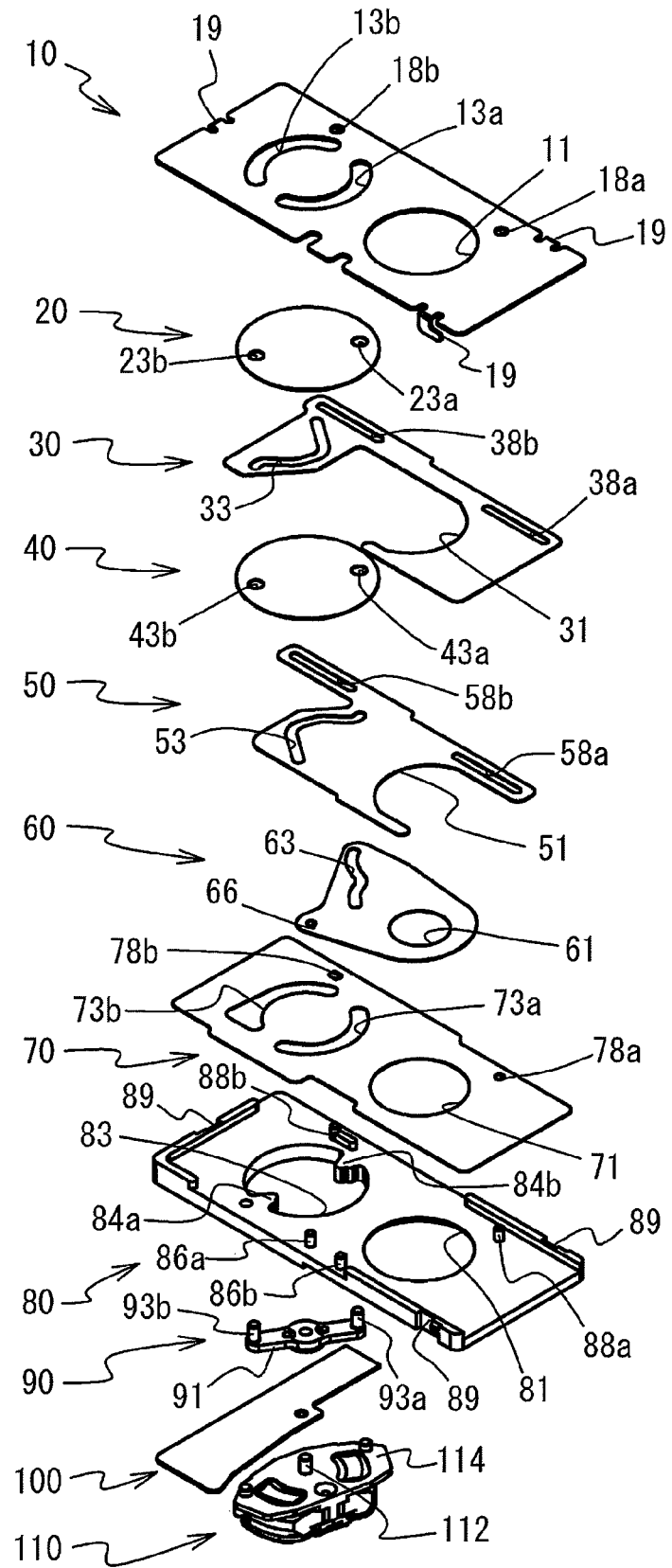
FIG. 1 is an exploded view of a light amount adjusting device.

A description will be given of a light amount adjusting device according to the present embodiment with reference to the drawings. FIG. 1 is an exploded view of a light amount adjusting device 1. The light amount adjusting device 1 includes a blade-supporting plate 10, a slide plate 20, a linear moving blade (a first linear moving blade) 30, a slide plate 40, a linear moving blade (a second linear moving blade) 50, a swinging blade 60, a thin plate 70, a board 80, a drive lever 90, a FPC 100, and an electromagnetic actuator 110. The linear moving blades 30 and 50, and the swinging blade 60 are movably supported by the board 80. The movements of the linear moving blades 30 and 50 and the swinging blade 60 allow the light amount passing through openings 11, 71, and 81 to be adjusted.

The blades or the likes are held between the blade-supporting plate 10 and the board 80. The blade-supporting plate 10 has the opening 11 through which the object light passes. Further, the blade-supporting plate 10 has an arc-shaped escape hole 13a for escaping a drive pin 93a of the drive lever 90, and an arc-shaped escape holes 13b for escaping a drive pin 93b. The opening 11, and the escape holes 13a and 13b are provided in this order in the longitudinal direction of the blade-supporting plate 10. The blade-supporting plate 10 is provided with plural nail portions 19 at its periphery. Likewise, the board 80 is provided with engagement portions 89 at its periphery. By engaging the nail portion 19 with the engagement portion 89, the blade-supporting plate 10 and the board 80 are assembled.

The linear moving blade 30 is provided with a cutout 31 having an arc shape and a cam slot 33 engaging the drive pin 93b of the drive lever 90. The cam slot 33 is bent at its partway. Further, the linear moving blade 30 is provided with guide slots 38a and 38b which respectively engage guide pins 88a and 88b formed in the board 80. The guide slots 38a and 38b are formed in the longitudinal direction of the board 80. By respectively engaging the guide slots 38a and 38b with the guide pins 88a and 88b, the linear moving blade 30 is linearly and movably supported. The slide plate 20 is sandwiched between the blade-supporting plate 10 and the linear moving blade 30. Additionally, the slide plate 40 is sandwiched between the linear moving blades 30 and 50. The slide plate 20 is provided with fitting holes 23a and 23b respectively engaging the drive pins 93a and 93b. Also, the slide plate 40 is provided with fitting holes 43a and 43b respectively engaging the drive pins 93a and 93b. The slide plates 20 and 40 each has a circular plate shape. The slide plates 20 and 40 have a function for preventing an operational defect, of each blade, generated between the blade-supporting plate 10 and the linear moving blade 30, and between the linear moving blades 30 and 50.

The linear moving blade 50 is provided with a cutout 51 having a circular shape and a cam slot 53 engaging the drive pin 93a of the drive lever 90. The cam slot 53 is bent at its partway. Further, the linear moving blade 50 is provided with guide slots 58a and 58b which respectively engage guide pins 88a and 88b. The guide slots 58a and 58b are formed in the longitudinal direction of the linear moving blade 50. By respectively engaging the guide slots 58a and 58b with the guide pins 88a and 88b, the linear moving blade 50 is linearly and movably supported.

The swing blade 60 has a small aperture opening 61 with its diameter smaller than each diameter of the openings 11, 71, and 81. The swing blade 60 has a cam slot 63 engaging the drive pin 93a. The swing blade 60 has a spindle hole 66 slidably and rotatably engaging a spindle 86a formed on the board 80. Thus, the swinging blade 60 is swingably supported by the spindle 86a. The rotation of the drive lever 90 rotates the drive pin 93a and swings the swinging blade 60. The board 80 has a positioning pin 86b for defining the position where the small aperture opening 61 overlaps the openings 11, 71, and 81. The positioning pin 86b has a projection shape.

The thin plate 70 is provided with the opening 71 through which the object light passes, and escape holes 73a and 73b which respectively permit the swinging of the drive pins 93a and 93b. Further, the thin plate 70 is provided with fitting holes 78a and 78b respectively engaging the guide pins 88a and 88b. This secures the thin plate 70 at the board 80.

The board 80 is provided with the opening 81 through which the object light passes, and an escape hole 83 which permits the rotation of the drive lever 90. Additionally, as will be described later, the board 80 is provided with restrict portions 84a and 84b for restricting the rotational range of the drive lever 90. The restrict portions 84a and 84b are projected to face each other at the center of the escape hole 83.

In addition, the opening 71 has the diameter smaller than any other one of the openings 11 and 81. Thus, the amount of exposure in a fully opened state as mentioned later depends on the diameter of the opening 71.

The drive lever 90 includes: an arm portion 91; and the drive pins 93a and 93b which are respectively provided at a first and second ends of the arm portion 91. The drive pin 93a corresponds to a first drive pin. The drive pin 93b corresponds to a second drive pin.

In the drive lever 90, the center of the arm portion 91 is connected to a rotary shaft 112 of the electromagnetic actuator 110. The drive lever 90 is rotated by the drive force of the electromagnetic actuator 110.

The FPC 100 is provided for electrically connecting an external device to the electromagnetic actuator 110. The FPC 100 is flexible.

The electromagnetic actuator 110 includes: a rotor; a stator; a coil; and a base plate 114. The rotor has different polarities in its circumferential direction, and is rotatably supported. The stator is shaped to substantially surround the rotor. The coil is wound around the rotor. The stator is magnetized by an energized state of the coil, so that the magnetically attractive force and repulsive force are generated between the stator and the rotor. Accordingly, the rotor rotates. Since the electromagnetic actuator 110 is a so-called step motor, the position where the rotor is stopped is controlled by the energized state of the coil. The rotary shaft 112 is press fitted into the rotor, and rotates in conjunction with the rotor. The rotor, the stator, and the coil are integrally assembled into the base plate 114.

Figure 2:
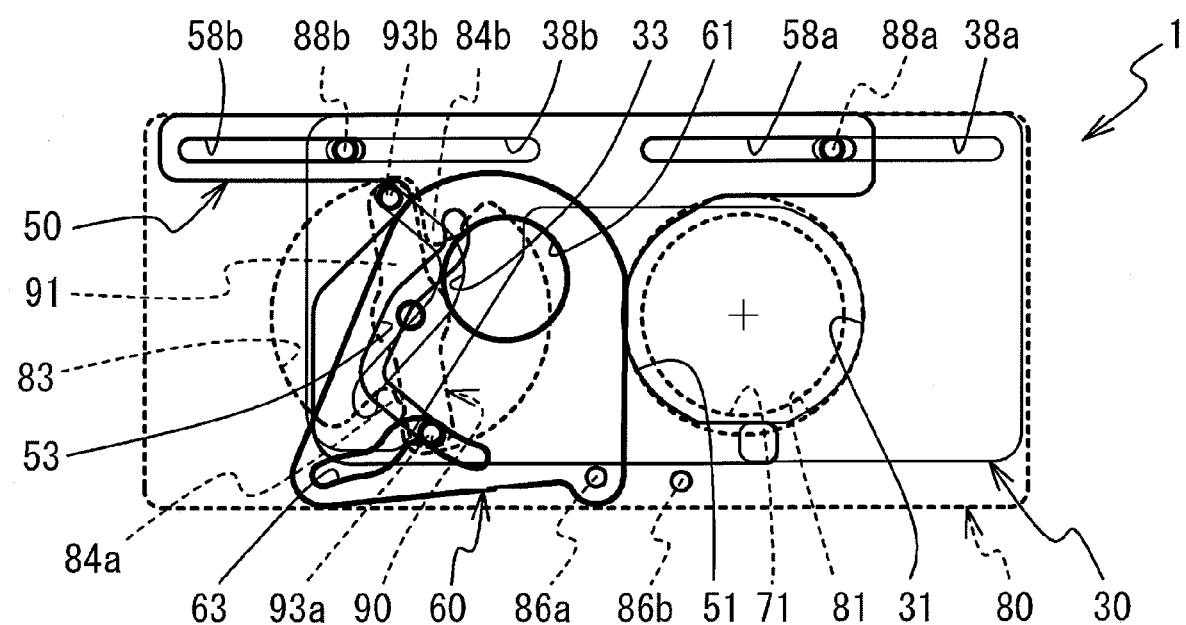
FIG. 2 is a front view of the light amount adjusting device in a fully opened state.
Figure 3:
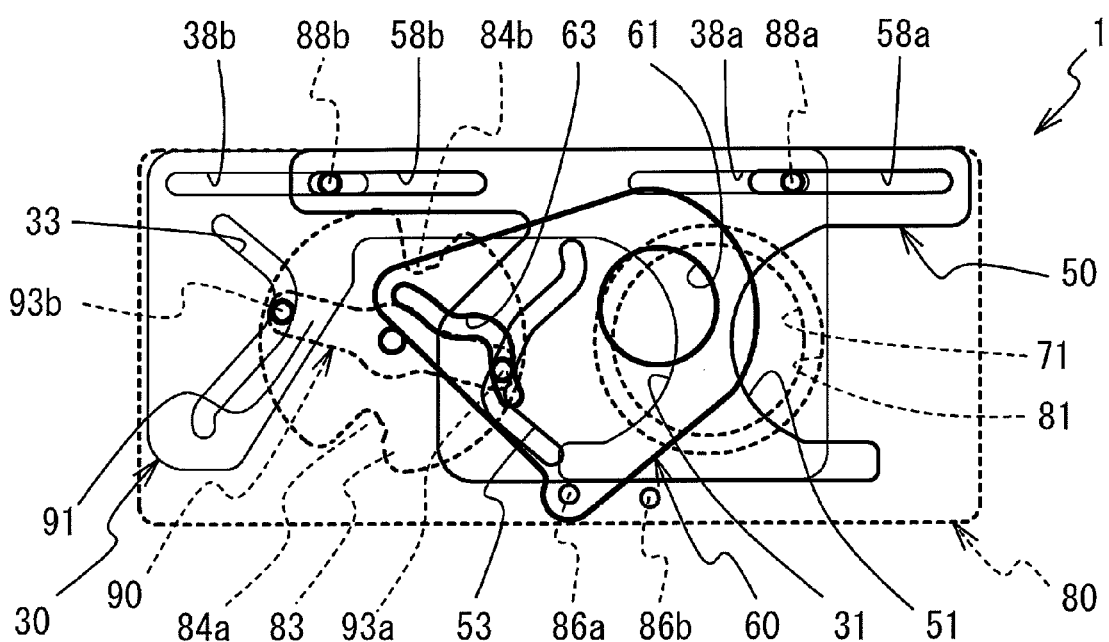
FIG. 3 is a front view of the light amount adjusting device in a fully closed state.
Figure 4:
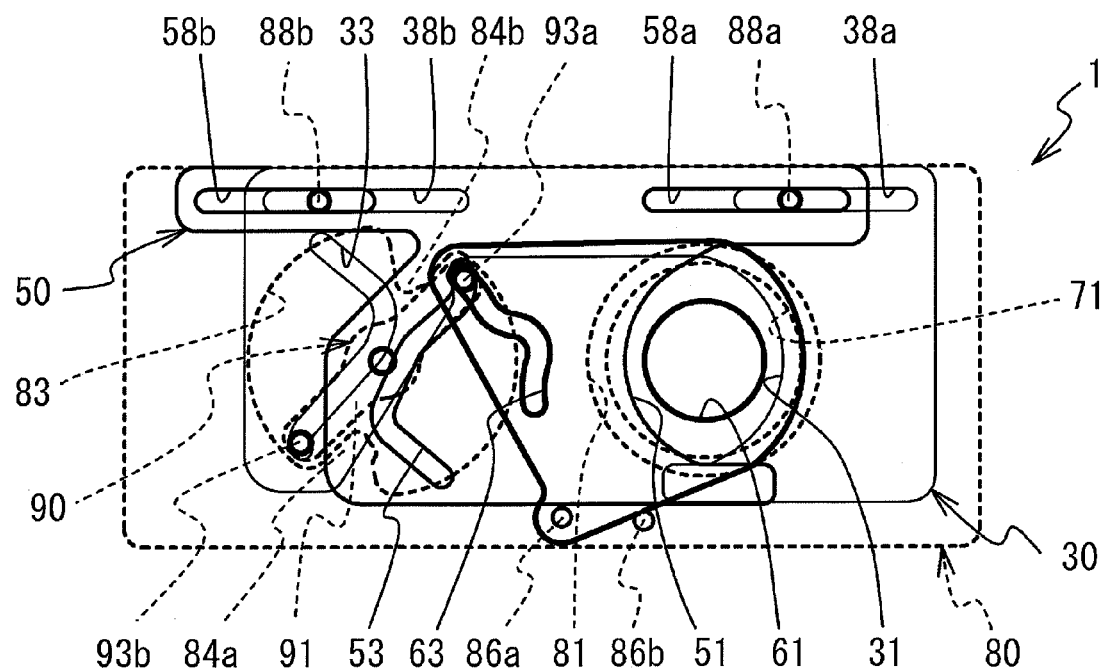
FIG. 4 is a front view of the light amount adjusting device in a small aperture state.

Next, a description will be given of the movements of the blades. FIGS. 2 to 4 illustrate the states of the movements of the blades. FIG. 2 illustrates the fully opened state. FIG. 3 illustrates a fully closed state. FIG. 4 illustrates a small aperture state. In addition, the blade-supporting plate 10, the slide plates 20 and 40, the thin plate 70 are omitted in FIGS. 2 to 4. However, the opening 71 is indicated by a dashed line. Also, the linear moving blades 30 and 50, the swinging blade 60, and the board 80 are indicated by different types of lines. The linear moving blade 30 is indicated by a thin line, the linear moving blade 50 is indicated by a solid line, and the swinging blade 60 is indicated by a heavy line. In addition, the board 80 is indicated by a dashed line.

A description will be given of the fully opened state with reference to FIG. 2. The cutouts 31 and 51 are receded from the openings 71 and 81. Further, the cutouts 31 and 51 are located to face each other across the openings 71 and 81. The swing blade 60 is also receded from the openings 71 and 81. The drive lever 90 is positioned in substantially parallel to the widthwise direction of the light amount adjusting device 1. In the fully opened state, the drive pin 93a is positioned at one end of the cam slot 53, and at a partway of the cam slot 63. The drive pin 93b is positioned at one end of the cam slot 33. In this way, the linear moving blades 30 and 50, and the swinging blade 60 are receded from the openings 71 and 81 to form the fully opened state.

A description will be given of an action from the fully opened state to the fully closed state.

Next, the drive lever 90 rotates counterclockwise from the state illustrated in FIG. 2, and the drive pin 93a moves toward the openings 71 and 81, and the drive pin 93b moves away from the openings 71 and 81. The drive pin 93a moves away from one end of the cam slot 53, and passes through a bent section at the partway of the cam slot 53. This moves the linear moving blade 50 in such a position to overlap the openings 71 and 81. Specifically, the linear moving blade 50 moves in the right-hand direction in FIG. 2.

The drive pin 93b moves away from the one end of the cam slot 33, and passes through the bent section of the partway of the cam slot 33. This also moves the linear moving blade 30 in such a position to overlap the openings 71 and 81. Specifically, the linear moving blade 30 moves in the left-hand direction in FIG. 2. That is, the linear moving blades 30 and 50 move in opposite directions to enlarge their overlapping amount. As illustrated in FIG. 3, the linear moving blades 30 and 50 cooperatively cover the openings 71 and 81 to form the fully closed state.

Further, the engagement of the drive pin 93a with the cam slot 63 causes the swinging blade 60 to swing clockwise about the spindle 86a. Therefore, the swinging blade 60 moves from the position receded from the openings 71 and 81 to the overlapped position. Furthermore, the rotational position of the electromagnetic actuator 110 in the fully closed state is controlled by the energized state of the coil.

Next, a description will be given of an action from the fully closed state to the small aperture state.

When the drive lever 90 further rotates counterclockwise from the state illustrated in FIG. 3, the drive pin 93a moves away from the openings 71 and 81 and the drive pin 93b moves toward the openings 71 and 81. The drive pin 93a moves to the other end of the cam slot 53. Accordingly, the linear moving blade 50 further moves in the direction opposite to such a direction as to shift the fully opened state to the fully closed state, that is, in the left-hand direction in FIG. 3.

The drive pin 93b moves toward the other end of the cam slot 33. Therefore, like the linear moving blade 50, the linear moving blade 30 further moves in the direction opposite to the direction of the action while the fully opened state is being shifted to the fully closed state, that is, in the right-hand direction in FIG. 3. Herein, the linear moving blades 30 and 50 further move in the opposite directions. At this time, the cutouts 31 and 51 face each other across the centers of the openings 71 and 81.

In addition, the drive pin 93a moves toward the other end of the cam slot 63, and the swinging blade 60 further swings clockwise. The small aperture opening 61 overlaps the openings 71 and 81 in a concentric manner. Moreover, the small aperture opening 61 is arranged between the cutouts 31 and 51. Consequently, the swinging blade 60 forms the small aperture state. Additionally, when the drive lever 90 rotates clockwise from the small aperture state, the state is shifted to the fully closed state, and then to the fully opened state.

As mentioned above, the small aperture state is formed by the small aperture opening 61 formed in the swinging blade 60, thereby suppressing the fluctuation in the amount of exposure in the small aperture state. This also suppresses the fluctuation in image quality.

Further, in a light amount adjusting device in which plural blades swing, the blades receded from an opening are positioned in the vicinity of the opening formed in a board. Thus, such a light amount adjusting device has to have a substantially circular shape with the opening used as the center. Likewise the so-called guillotine type of a light amount adjusting device having a rectangular shape, the fluctuate in the amount of exposure can be suppressed by modifying the blade forming the fully closed state to that of a linearly moving type, and by modifying the blade forming the small aperture state to that of a swinging type.

It is also conceivable to modify the blade having the small aperture opening to that of a linear moving type, like the other blades. However, as the linear moving blades 30 and 50 illustrated, the linear moving type of the blade has to be formed with oblong slots such as the guide slots 38a, 38b, 58a, and 58b, in order to restrict the moving direction of such a blade. The small aperture opening 61 has to be moved toward the opening 71. For this reason, the linear moving blades 30 and 50 increase their sizes in their moving directions. In the above embodiment, the swinging type of the swinging blade 60 allows the blade to maintain its small size, and this contributes to a small size of the entire device.

Further, as mentioned above, the board 80 is provided with the restrict portions 84a and 84b which project to the center of the escape hole 83 to face each other. As illustrated in FIG. 4, in the small aperture state, the drive lever 90 is positioned at a given rotational position by abutting the restrict portion 84b. This restricts the position of the drive lever 90 in the small aperture state. Furthermore, in the small aperture state, the swinging blade 60 comes into contact with the positioning pin 86b adjacent to the spindle 86a of the board 80. By abutting the swinging blade 60 with the positioning pin 86b, the position of the swinging blade 60 is defined when the small aperture opening 61 and the openings 71 and 81 are overlapped. This maintains the position of the swinging blade 60 in the small aperture state with stability.

In the fully opened state, as illustrated in FIG. 2, the drive lever 90 is positioned at a given rotational position by abutting the restrict portion 84a. Accordingly, the position of the drive lever 90 is restricted in the fully opened state.

While the exemplary embodiments of the present invention have been illustrated in detail, the present invention is not limited to the above-mentioned embodiments, and other embodiments, variations and modifications may be made without departing from the scope of the present invention.

In the above embodiment, the linear moving blades 30 and 50 cooperatively form the fully closed state. However, the present invention is not limited to such a configuration, the linear moving type of a single blade may form the fully closed state. Further, a single linear moving blade and a swinging blade having a small aperture opening may cooperatively form the fully closed state.

The light amount adjusting device 1 is applicable to an optical device having a lens or the like. Even in a case where the light amount adjusting device 1 is employed in the optical device, the fluctuation in image quality can be suppressed.

Finally, several aspects of the present invention are summarized as follows.

According to an aspect of the present invention, there is provided a light amount adjusting device including: a board including an opening; a linear moving blade linearly and movably supported by the board; and a swinging blade swingably supported by the board, wherein: the linear moving blade and the swinging blade are receded from the opening to form a fully opened state; the linear moving blade covers the opening to form a fully closed state; and the swinging blade has a small aperture opening with a diameter smaller than a diameter of the opening, and causes the small aperture opening and the opening to be overlapped with each other to form a small aperture state. Since the swinging blade has the small aperture opening, the fluctuation in the aperture can be suppressed in the small aperture state. This maintains the amount of exposure constant and suppresses the fluctuation in image quality.

Additionally, an optical device equipped with the above light amount adjusting device suppresses the fluctuation in image quality.

What is claimed is:

1. A light amount adjusting device comprising:
a board including an opening;
a pair of linear moving blades linearly and movably supported by the board; and
a swinging blade swingably supported by the board, wherein:
the pair of linear moving blades and the swinging blade are receded from the opening to form a fully opened state;
the pair of linear moving blades covers the opening to form a fully closed state; and
the swinging blade has a small aperture opening with a diameter smaller than a diameter of the opening, and causes the small aperture opening and the opening to be overlapped with each other to form a small aperture state.

2. The light amount adjusting device of claim 1, wherein the board includes a positioning portion positioning the swinging blade when the small aperture opening and the opening are overlapped with each other.

3. The light amount adjusting device of claim 2, further comprising a drive lever rotating to drive the pair of linear moving blades and the swinging blade,
wherein:
the board includes a restriction portion restricting a rotational range of the drive lever; and the swinging blade is defined by the positioning portion in such a position that the opening and the small aperture opening are overlapped with each other, when the rotation of the drive lever is restricted by the restriction portion.

4. A light amount adjusting device comprising:
a board including an opening;
at least one linear moving blade linearly and movably supported by the board; and
a swinging blade swingably supported by the board, wherein:
the at least one linear moving blade and the swinging blade are receded from the opening to form a fully opened state;
the at least one linear moving blade covers the opening to form a fully closed state;
the swinging blade has a small aperture opening with a diameter smaller than a diameter of the opening, and causes the small aperture opening and the opening to be overlapped with each other to form a small aperture state; and
the board includes a positioning portion positioning the swinging blade when the small aperture opening and the opening are overlapped with each other,
further comprising a drive lever rotating to drive the at least one linear moving blade and the swinging blade, wherein:

the at least one linear moving blade includes first and second linear moving blades;

the drive lever includes, an arm portion, and first and second drive pins respectively formed at first and second ends of the arm portion;

the first drive pin engages the first linear moving blade and the swinging blade; and the second drive pin engages the second linear moving blade.

5. An optical device comprising a light amount adjusting device including:

a board including an opening;

a pair of linear moving blades linearly and movably supported by the board; and a swinging blade swingably supported by the board, wherein:

the pair of linear moving blades and the swinging blade are receded from the opening to form a fully opened state;

the pair of linear moving blades covers the opening to form a fully closed state; and the swinging blade has a small aperture opening with a diameter smaller than a diameter of the opening, and causes the small aperture opening and the opening to be overlapped with each other to form a small aperture state.

* * * * *